(12) United States Patent
Sood et al.

(10) Patent No.: US 10,499,346 B2
(45) Date of Patent: Dec. 3, 2019

(54) SYSTEM AND METHOD EXTENDING RANGE OF A WIRELESS NETWORK

(71) Applicant: Cypress Semiconductor Corporation, San Jose, CA (US)

(72) Inventors: Ayush Sood, Bangalore (IN); Ashok Nimmala, Telangana (IN); Kempraju G, Bangalore (IN); Kamesh Medapalli, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/359,714

(22) Filed: Mar. 20, 2019

(65) Prior Publication Data
US 2019/0306806 A1 Oct. 3, 2019

Related U.S. Application Data

(60) Provisional application No. 62/651,869, filed on Apr. 3, 2018.

(51) Int. Cl.
*G08C 25/02* (2006.01)
*H04W 52/24* (2009.01)

(52) U.S. Cl.
CPC ....... *H04W 52/245* (2013.01); *H04W 52/243* (2013.01)

(58) Field of Classification Search
CPC ............. H04W 52/146; H04W 52/281; H04W 52/367; H04W 84/12
USPC ...... 455/69, 522, 63.1, 553.1; 370/252, 329, 370/338
See application file for complete search history.

(56) References Cited

U.S. PATENT DOCUMENTS

| | | | |
|---|---|---|---|
| 10,129,064 B1 * | 11/2018 | Lee | H04L 27/2627 |
| 2005/0113026 A1 * | 5/2005 | Moorti | H04L 5/0023 455/63.1 |
| 2005/0172199 A1 * | 8/2005 | Miller | H04L 1/08 714/749 |
| 2005/0181823 A1 * | 8/2005 | Haartsen | H04W 16/14 455/553.1 |
| 2005/0250528 A1 * | 11/2005 | Song | H04W 52/32 455/522 |
| 2008/0311865 A1 | 12/2008 | Worfolk et al. | |
| 2009/0219851 A1 * | 9/2009 | Abraham | H04L 1/1812 370/315 |
| 2010/0008436 A1 * | 1/2010 | Zhang | H04L 1/0079 375/260 |

(Continued)

OTHER PUBLICATIONS

International Search Report for International application No. PCT/US19/23588 dated Jun. 11, 2019, 2 pages.

(Continued)

*Primary Examiner* — Tan H Trinh

(57) ABSTRACT

A system and method are provided for extending range of devices in a legacy wireless network. Generally, the method involves providing in a transmitter of the system a frame having a first field including a number of preamble segments and a second field including a number of data segments. The transmitter in the system is then operated to transmit at least one of the preamble segments with at least a first transmit power, and to transmit the segments of the second field at a second transmit power, wherein the first transmit power is greater than the second transmit power. Other embodiments are also described.

17 Claims, 9 Drawing Sheets

(56) References Cited

U.S. PATENT DOCUMENTS

| | | |
|---|---|---|
| 2012/0207140 A1* | 8/2012 | Yu .................. H04L 1/0027 370/338 |
| 2012/0327879 A1* | 12/2012 | Stadelmeier ......... H04B 7/0689 370/329 |
| 2013/0035084 A1 | 2/2013 | Song et al. |
| 2014/0362935 A1 | 12/2014 | Porat et al. |
| 2015/0358904 A1* | 12/2015 | Kwon ............... H04W 52/0206 370/252 |
| 2016/0036388 A1 | 2/2016 | Xu et al. |
| 2016/0050634 A1* | 2/2016 | Seok .................. H04W 52/146 370/338 |
| 2016/0087827 A1 | 3/2016 | Zhang et al. |
| 2017/0070315 A1* | 3/2017 | Suh .................. H04L 1/0061 |
| 2017/0155536 A1* | 6/2017 | Xu .................. H04L 27/3405 |
| 2017/0250848 A1* | 8/2017 | Lee .................. H04W 52/36 |
| 2017/0279640 A1 | 9/2017 | Yang et al. |
| 2017/0303204 A1* | 10/2017 | Hu .................. H04W 52/06 |
| 2017/0310516 A1* | 10/2017 | Lee .................. H04L 27/2608 |
| 2018/0123737 A1* | 5/2018 | Vermani ............... H04L 1/0079 |
| 2019/0068253 A1* | 2/2019 | Venkatachalam Jayaraman ......... H04B 7/0417 |

OTHER PUBLICATIONS

Written Opinion of the International Searching Authority for International application No. PCT/US19/23588 dated Jun. 11, 2019, 10 pages.

* cited by examiner

SYSTEM AND METHOD EXTENDING RANGE OF A WIRELESS NETWORK

CROSS-REFERENCE TO RELATED APPLICATIONS

This application claims the benefit of priority under 35 U.S.C. 119(e) to U.S. Provisional Patent Application Ser. No. 62/651,869, filed Apr. 3, 2018, which is incorporated by reference herein in its entirety.

TECHNICAL FIELD

This disclosure relates generally to wireless communication networks, and more particularly to WiFi or Wireless Local Area Networks (WLANs) using an IEEE 802.11 standard, and methods and systems for extending a range of access points and stations in such a wireless network.

BACKGROUND

Recent years have seen an expansion in use of wireless networks, such as WiFi and Wireless Local Area Networks (WLAN), beyond being used for connecting personal computers and peripheral devices to each other, to a local area network and/or the Internet. Today wireless networks are used to connect a large number of different types of devices, including phones, tablets and IoT (Internet of Things) systems and devices, such as wireless speakers and headphones, cars, wearables and medical devices, to an access point (AP). This expansion in use of wireless networks has been accompanied by a number of new technical challenges. Chief among these is the need for wireless networks using the latest technology communication standards or protocol to communicate with mobile wireless systems and devices, commonly referred to a stations (STA) using earlier technology and previous generations of communication protocol. These stations usually have lower maximum transmit power compared to the access point often resulting in asymmetric link, where the station can receive transmissions from the access point, but the stations transmissions cannot reach the access point, limiting the effective range of the wireless network.

Accordingly, there is a need for systems and methods for extending a range of access points and stations in wireless networks.

SUMMARY

Systems and methods of operating the same are provided for extending a range of access points and stations in wireless networks.

Generally, the method involves providing in a transmitter of the system a frame having a first field including a number of preamble segments and a second field including a number of data segments. The transmitter in the system is then operated to transmit at least one of the preamble segments with at least a first transmit power, and to transmit the segments of the second field at a second transmit power, wherein the first transmit power is greater than the second transmit power.

In one embodiment, the method further includes after operating the transmitter to transmit at least one of the number of preamble segments with at least a first transmit power determining whether the transmitted frame has been received by an access point in the wireless network; and if the transmitted frame has not been received, re-transmitting the frame while operating the transmitter to transmit at least one of the number of preamble segments with a third transmit power greater than the first transmit power.

In another embodiment, operating the transmitter includes operating the transmitter to transmit a plurality of preamble segments, where a transmit power of each of the preamble segments is between the first transmit power and the second strength and is independent of the transmit power of other preamble segments.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

Figure 1:
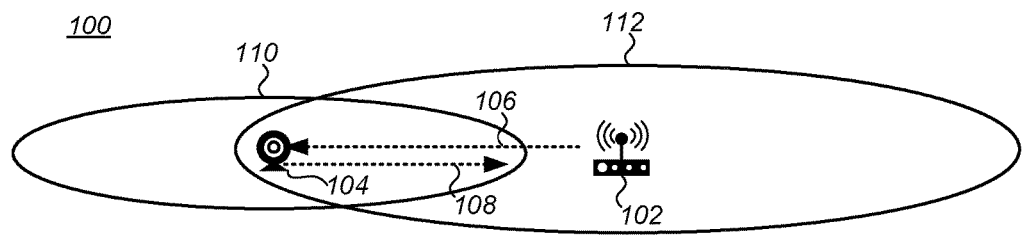
FIG. 1 is a block diagram illustrating an asymmetric link between an access point (AP) and a station (STA) in a wireless network for which systems and methods of the present disclosure is particularly useful.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION

A system and method are disclosed for extending a range of access points, stations or devices in a wireless communication network. The system and method of the present disclosure are particularly useful in frame based wireless network, such as a WiFi or Wireless Local Area Network (WLAN), using a pre-IEEE 802.11ax or WiFi Gen 6 standard or protocol due to a lower maximum transmit power of stations or devices compared to an access point, often resulting in asymmetric link between the stations or devices and access point.

FIG. 1 is a block diagram illustrating an asymmetric link in a wireless network 100 between an access point (AP 102) and a station (STA 104). FIG. 1 shows how transmissions 106 transmitted from the AP 102 can reach the STA 104, but due to a typically lower transmit power of the STA transmissions 108 and smaller STA field 110 transmissions by the STA cannot be received by AP. In a frame-based wireless communication system or network, such as a WiFi or Wireless Local Area Network (WLAN), these transmissions are formatted as frames, and typically include preamble segments in a first field of the frame and data segments in a second field. The unreceived frame (transmission 108) transmitted by the STA 104 can be either a unicast frame by the STA, or an acknowledgement (ACK) frame transmitted upon entering an AP field 112 or range of the AP 102 in response to a unicast frame by the AP, such as a Clear to Send (CTS) frame or a request to Send (RTS) frame.

Figure 2:
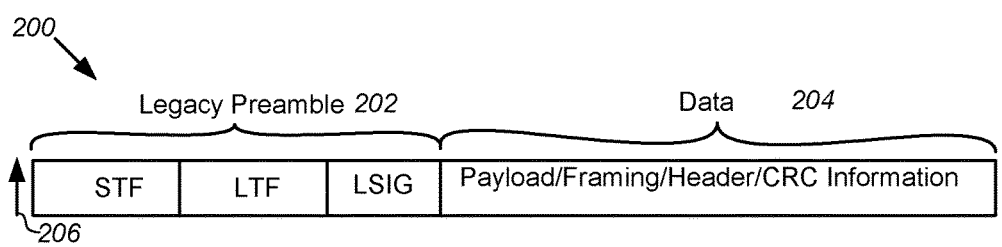
FIG. 2 is a block diagram depicting an embodiment of a format of a standard frame in a wireless network operated using an IEEE 802.11 standard or protocol.

FIG. 2 is a block diagram depicting an embodiment of a frame format in a wireless network operated using an IEEE 802.11 protocol. Referring to FIG. 2 it is noted that in systems using a pre-802.11ax protocol the standard OFDM (orthogonal frequency division multiplexing) frame 200 generally includes or consists of a first or legacy preamble field 202 including a number of preamble sub-fields or segments, and a data field 204, which can have training fields or header information for a PHY layer followed by FEC (Forward error correction) coded data payload. The legacy preamble field 202 generally includes a short training field (STF), a long training field (LTF), and a signal field (SIG). These legacy preamble segments are used in all 802.11ax and pre-802.11ax protocols for frame detection. The STF and LTF segment are used for frame identification and front end synchronization. The SIG segment describes data rate and length of the frame in unit of bytes. A power or transmit power with which the fields 202, 204 of the frame 200 are represented schematically in FIG. 2 by a vertical height of the fields as indicated by arrow 206. As shown in the FIG. 2, in the standard frame 200 the legacy preamble field 202 and the data field 204 are transmitted with the same transmit power.

It has been found that in many commercial implementations frame based wireless networks range is limited due to the inability to detect a frame, and not due to an inability to decode data in the data field of the frame. Thus, the system and method of the present disclosure boosts or increases an effective range of a range of access points, stations or devices in a WiFi or WLAN using a pre-IEEE 802.11ax protocol by independently increasing or boosting the transmit power with which one or more of the segments (STF, LTF, SIG) in the legacy preamble field are transmitted. This improves the detection capability of such a frame transmitted and extending the range at which it can be received by an AP or any other wireless station or device.

Figure 3A:
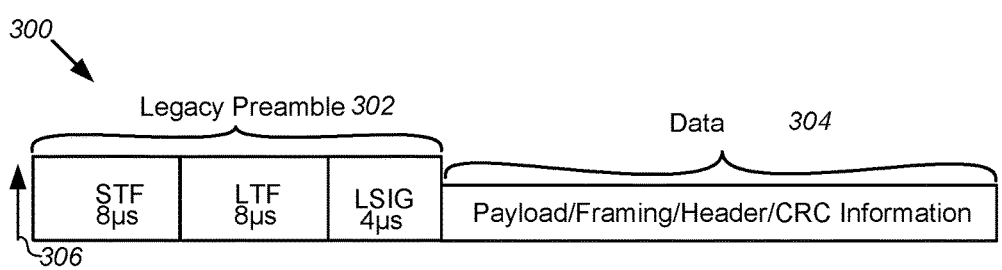
FIGS. 3A through 3D are block diagrams depicting various embodiment of a range extending frame in which power used to transmit legacy preamble fields has been increased or boosted by a variable power boost applied to one or more of these fields in accordance with an embodiment of the present disclosure.

FIGS. 3A through 3D are block diagrams showing formats of range extending frames in a wireless network operated using an IEEE 802.11 protocol according to various embodiments of the present disclosure. Referring to FIG. 3A it is noted that in this frame 300 a transmit power of the preamble segments (STF, LTF, SIG) of a preamble field 302 have been boosted to a first signal strength or transmit power beyond that of a second transmit power of a data field 304, as indicated by arrow 306. Although in the embodiment shown in FIG. 3A substantially all of the preamble segments (STF, LTF, SIG) have been boosted by a substantially equal amount, that need not be the case in every embodiment. Instead the transmit power with which each preamble segment in the preamble field 302 is transmitted can be independently increased to a transmit power between the second transmit power of the data field 304 and a predetermined maximum transmit power. Additionally, as explained in greater detail below, the transmit power need not be increased to a final strength prior to transmission of an initial frame, rather the transmit power of one or more of the preamble segments can be incrementally increased in a number of successive frames until a frame is detected or the predetermined maximum transmit power is reached. The predetermined maximum transmit power can be based on either power limitations of commonly used wireless transmitters or on regulatory or protocol power limits. For example, in wireless networks using a pre-802.11ax protocol the transmit power with which each preamble segment in the preamble field 302 is transmitted can be boosted by up to about 6 dB over that of the of the data field 304 in 0.25 or 0.5 dB increments as long as no regulatory limits are violated, and IEEE Transmit metrics like EVM (Error Vector Magnitude) and Spectral Mask are met. No regulatory issues should arise as a boost of up to a maximum of 6 dB is applied only for a 4 to 24 us period, and thus an average power ratio of preamble segments in the preamble field 302 is up to several dB below that of the of the data field 304.

Figure 3B:
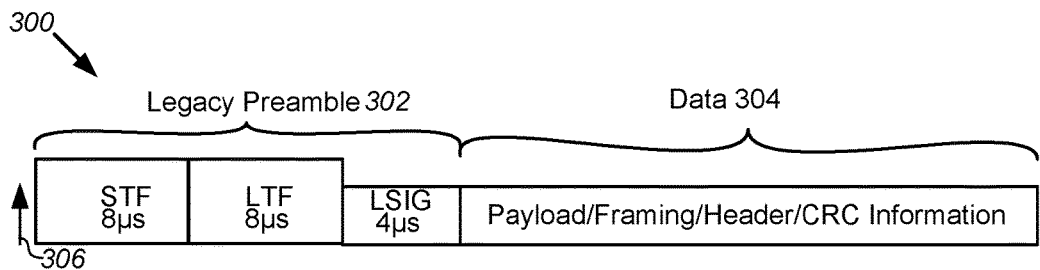

In another embodiment shown in FIG. 3B only the transmit power with which preamble segments STF and LTF in the preamble field 302 are transmitted is boosted over that of the data field 304 while the transmit power of preamble segment SIG is substantially unchanged over that of the data field.

Figure 3C:
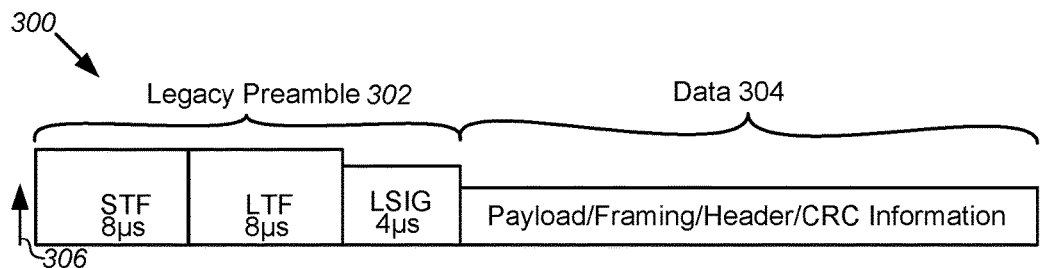

In the embodiment shown in FIG. 3C the transmit power with which preamble segments STF and LTF in the preamble field 302 are transmitted is boosted to a first transmit power over a second transmit power of the data field 304 while the transmit power of preamble segment SIG is transmitted is boosted to a third transmit power, greater than the second transmit power of the data field 304 but less than the first transmit power of the preamble segments STF and LTF.

Figure 3D:
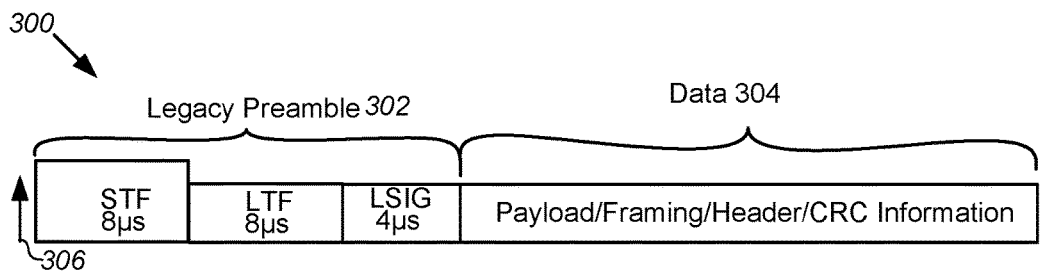

In the embodiment shown in FIG. 3D only the transmit power with which the preamble segment STF in the preamble field 302 is transmitted is boosted over that of the data field 304 while the transmit power of preamble segments LTF and SIG are substantially unchanged over that of the data field.

Figure 4:
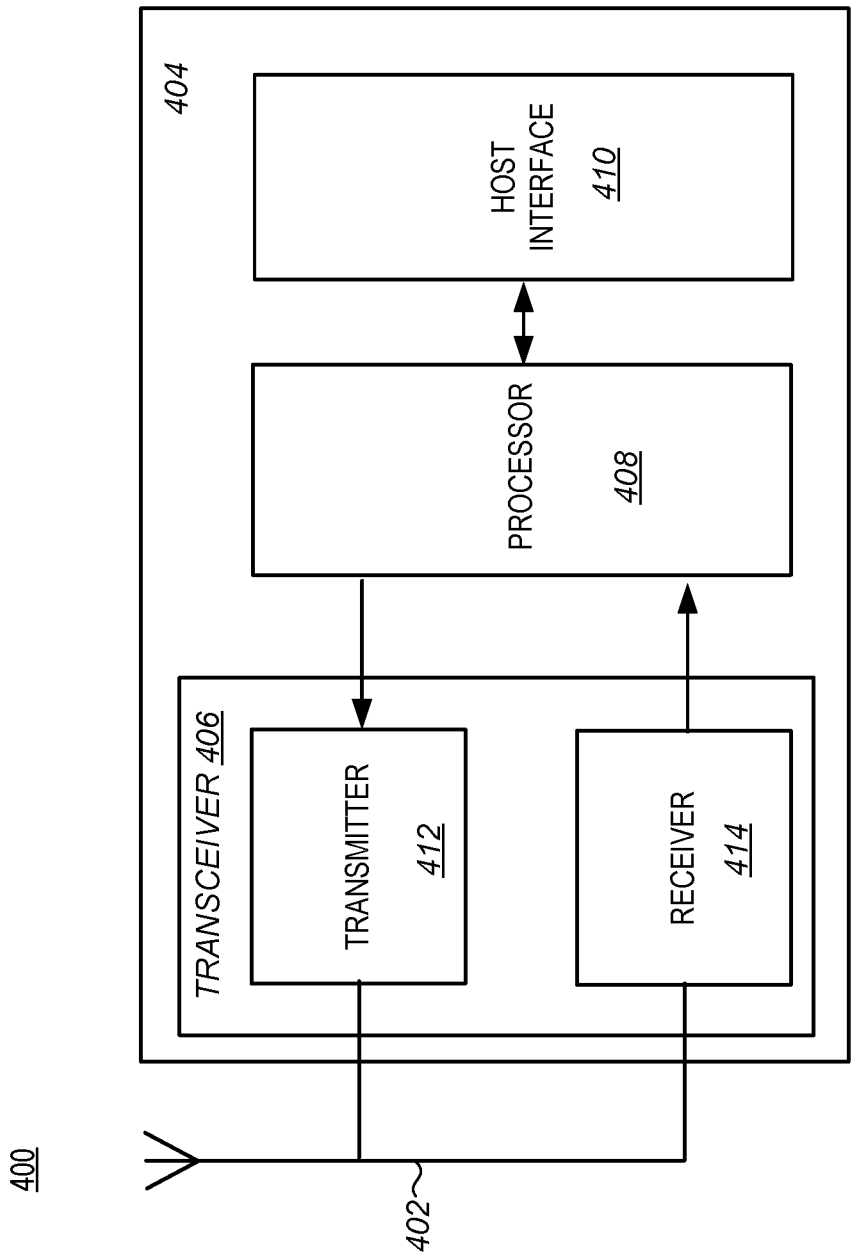
FIG. 4 is a block diagram depicting a communication system for which a transmitter with preamble boost circuitry and operated according to methods of the present disclosure is particularly useful.

A communication system for which a transmitter with preamble boost circuitry operated according to methods of the present disclosure is particularly useful will now be described with reference to FIG. 4. FIG. 4 is a simplified block diagram depicting an embodiment of a frame-based communication system 400, such as a WiFi or WLAN, using a pre-802.11ax protocol. Since communication system in general and radios in particular are well known in the art, detailed descriptions of well-known functions and structures incorporated of the communication system 400 depicted in FIG. 4 have been omitted to avoid obscuring the subject matter of the present disclosure.

Referring to FIG. 4, the communication system 400 generally includes an antenna 402, and a radio frequency (RF) transceiver 406, and a processor 408 or central processing unit (CPU), such as a Microprocessor and Memory Unit (µPU), and one or more host interfaces 410 thru which the communication system communicates with a host computer or device (not shown). The RF transceiver 406 includes a transmitter 412 configured to transmit signals provided by a modulating circuit in the processor 408 and a receiver 414 receive modulated signals and provide the modulated signals to a demodulating circuit in the processor for processing.

In one embodiment, components of the transceiver 406, processor 408 and interfaces 410 are integrally formed or incorporated on a single integrated circuit (IC) chip 404. The antenna 402 can also be integrally formed on the same IC chip, or on a separate chip or substrate packaged in a single multi-chip IC package with the IC chip including the transceiver 406, processor 408 and interfaces 410. Alternatively, the antenna 402, as well as other components of the communication system 400 can be separately implemented on a printed circuit board (PCB) to which the IC chip 404 is mounted or attached.

Embodiments of a transmitter for a communication system including preamble boost circuitry to increase or boost a transmit power of at least one of the preamble segments (STF, LTF, SIG) of a preamble field beyond that of a transmit power of a data field will now be described with reference to FIGS. 5 and 6.

Figure 5:
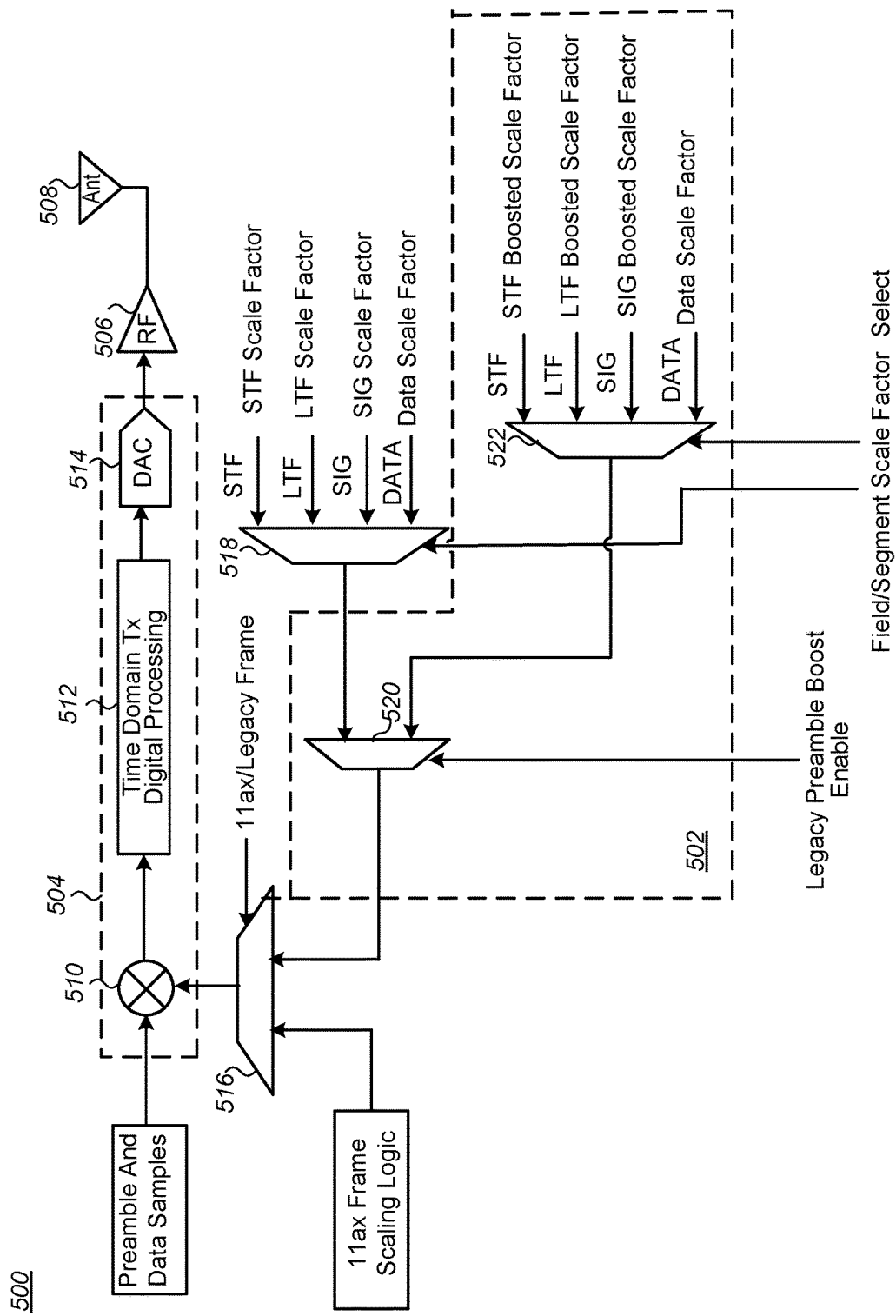
FIG. 5 is a block diagram depicting an embodiment of a portion of a transmitter including preamble boost circuitry to boost power used to transmit legacy preamble fields in accordance with an embodiment of the present disclosure.

FIG. 5 is a schematic block diagram depicting an embodiment of a portion of a transmitter 500 including preamble boost circuitry in which the boost is implemented in the time domain. Referring to FIG. 5, in addition to the preamble boost circuitry 502 the transmitter 500 includes a digital signal path 504, a radio frequency (RF) power amplifier (RF 506) coupled to an antenna 508, and a number of switching circuits or multiplexors (MUXs). As noted above the antenna 508 can be integrally formed on the same IC chip as other circuits and elements of the transmitter 500 or separate from the transmitter.

The digital signal path 504 includes a mixing or summing circuit 510, time domain transmit (Tx) digital processing circuit (DSP 512) and a number of digital to analog converters (DAC 514). The summing circuit 510 is configured to combine preamble and data samples received from a processor in the system (not shown in this figure) with 802.11ax scaling logic or a scale factor from a first switching circuit or multiplexor (MUX 516). The DSP 512 is configured to encode or transform a digital stream from the summing circuit 510 into an 802.11 frame format. The DAC 514 is configured to convert the digital signal from the DSP 512 into an analog signal suitable for RF transmission. The first MUX 516 is configured to receive an 802.11ax/Legacy frame signal from the processor and to couple to the summing circuit 510 either the 802.11ax scaling logic if the frame will be transmitted in the 802.11ax format or a standard or boosted scale factor if the frame will be transmitted in a pre-802.11ax format. The standard scale factors are provided independently for each field (data or preamble) and for each segment (STF, LTF, SIG) through a second MUX 518 coupled to the first MUX 516 through the preamble boost circuitry 502. The standard scale factors for each of the data segments/fields and preamble segments are output sequentially from the second MUX 518 in response to a field/segment select signal. Generally, the standard scale factors are predetermined fixed values either hardwired to inputs of the second MUX 518 are provided from registers in the processor or a memory of the communication system (not shown in this figure).

The preamble boost circuitry 502 generally includes at least two additional switching circuits or multiplexors including a third MUX 520 coupled to an input of the first MUX 516 and coupled to an output of the second MUX 518 and an output of a fourth MUX 522 in the preamble boost circuitry. The fourth MUX 522 is configured to independently or sequentially select scale factors for each of the data segments/fields and preamble segments in response to the same field/segment select signal applied to the second MUX 518. The third MUX 520 is configured to receive a legacy preamble boost enable signal from the processor, and to couple to the first MUX 516 either the boosted scale factors output from the fourth MUX 522 if the legacy preamble boost is enabled, or the standard scale factors output from the second MUX 518 if the legacy preamble boost is not enabled. The legacy preamble boost enable signal can be generated by the processor following indication an initial frame transmitted by the transmitter 500 has not been received by another access point (AP) or station (STA) in the wireless network. This indication can be accomplished, for example, by the transmitter 500 not receiving an acknowledgement (ACK) frame, a request to send (RTS) frame or clear to send (CTS) frame from the receiving station within a specified period of time following an initial transmission. Alternatively, legacy preamble boost enable signal can be generated by the processor prior to an initial transmission based on a predetermined low received transmit power indication (RSSI) or a predetermined high signal to noise ratio (SNR) of a received unicast frame or signal from another access point (AP) or station (STA) in the wireless network.

The boosted scale factors coupled to the fourth MUX 522 predetermined fixed or variable values either hardwired to inputs of the fourth MUX or provided from registers in the processor or memory of the communication system. By variable values it is meant both that boosted scale factors can be different for each field and/or preamble segment, and that the scale factor for each individual field and/or preamble segment can be changed over time from one transmitted frame to the next. As noted above with reference to FIGS. 3A through 3D, in one embodiment the boosted scale factor for each individual field and/or preamble segment can be changed over time to boost the transmit power with which each preamble segment in the preamble field is transmitted can be boosted in 0.25 or 0.5 dB increments up to a predetermined maximum transmit power. The predetermined maximum transmit power can be based on either power limitations of the transmitter 500 or on regulatory or protocol power limits. For example, in wireless networks using a pre-802.11ax protocol the maximum transmit power with which each preamble segment in the preamble field can be transmitted is about 6 dB over that of the of the data field. The variable values for the boosted scale factors for each field and/or preamble segment can be determined either by an algorithm executed in a processor associated with the transmitter, such as shown in FIG. 4, or by a look up table (LUT) in a memory of the system.

Figure 6:
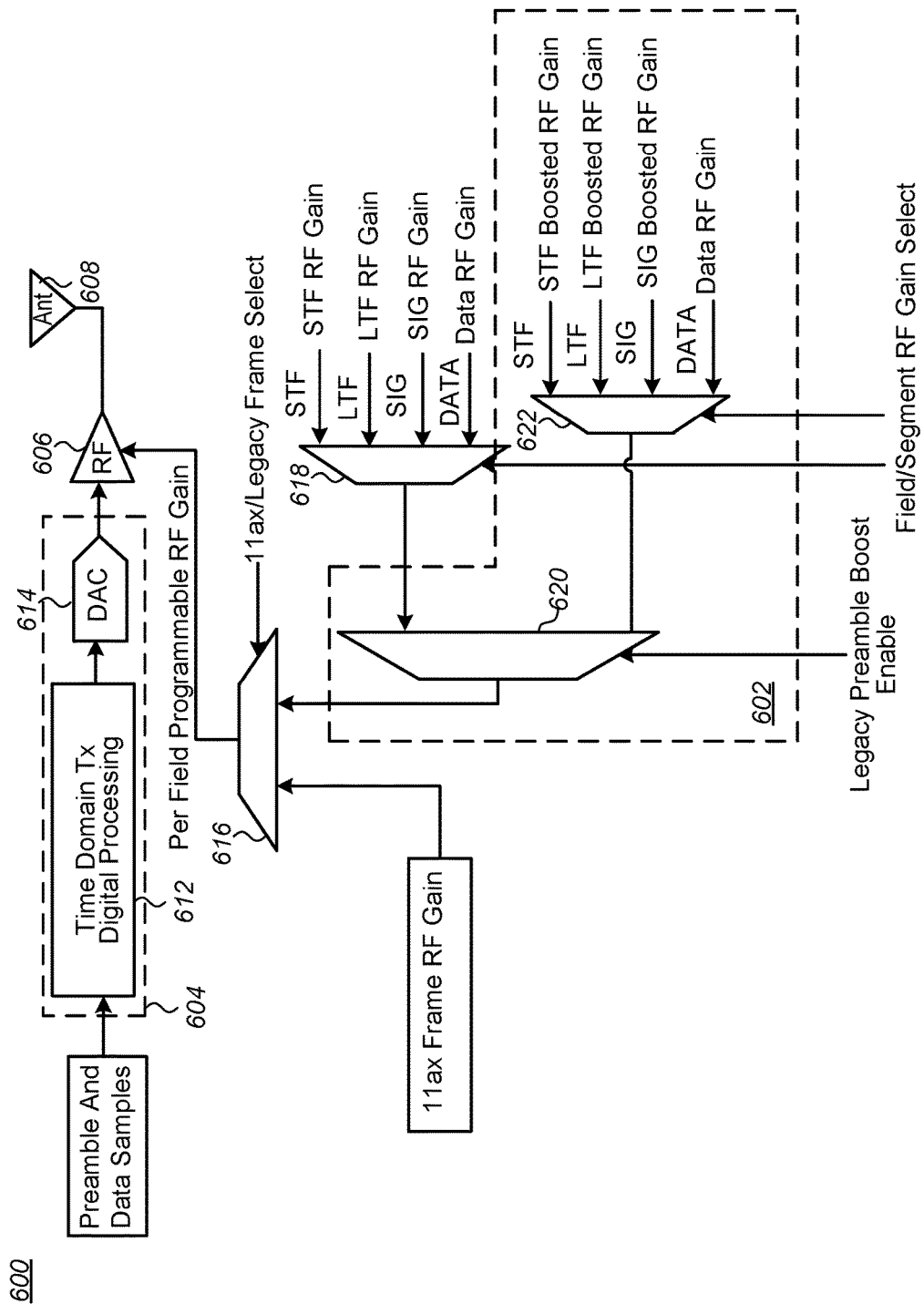
FIG. 6 is a block diagram depicting an embodiment of a portion of a transmitter including preamble boost circuitry to boost power used to transmit legacy preamble fields in accordance with another embodiment of the present disclosure.

FIG. 6 is a schematic block diagram depicting an embodiment of a portion of a transmitter 600 including preamble boost circuitry in which the boost is implemented in the frequency domain. Referring to FIG. 6, in addition to the preamble boost circuitry 602 the transmitter 600 includes a DSP 612, a radio frequency (RF) power amplifier (RF 606) coupled to an antenna 608, and a DAC 614 in a digital signal path 604, and a first MUX 616 and a second MUX 618.

The first MUX 616 is configured to receive an 802.11ax/Legacy frame signal from the processor and to couple to the RF power amplifier 606 either an 802.11ax frame RF gain if the frame will be transmitted in the 802.11ax format, or a standard or boosted RF gain if the frame will be transmitted in a pre-802.11ax format. The standard RF gains are provided independently for data segments/fields and for each field (data or preamble) and for each preamble segment (STF, LTF, SIG) through a second MUX 618 coupled to the first MUX 616 through the preamble boost circuitry 602 in response to a field/segment select signal. Generally, the standard RF gains are predetermined fixed values either hardwired to inputs of the second MUX 618 are provided from registers in the processor or a memory of the communication system (not shown in this figure).

The preamble boost circuitry 602 generally includes at least two additional switching circuits or multiplexors including a third MUX 620 coupled to an input of the first MUX 616 and coupled to an output of the second MUX 618 and an output of a fourth MUX 622 in the preamble boost circuitry. The fourth MUX 622 is configured to independently or sequentially select RF gains for each of the data segments/fields and preamble segments in response to the same field/segment select signal applied to the second MUX 618. The third MUX 620 is configured to receive a legacy preamble boost enable signal from the processor, and to couple to the first MUX 616 either the boosted RF gains output from the fourth MUX 622 if the legacy preamble boost is enabled, or the standard RF gains output from the second MUX 618 if the legacy preamble boost is not enabled. The legacy preamble boost enable signal can be generated by the processor following indication an initial frame transmitted by the transmitter 600 has not been received by another access point (AP) or station (STA) in the wireless network. This indication can be accomplished, for example, by the transmitter 600 not receiving an acknowledgement (ACK) frame, a request to send (RTS) frame or clear to send (CTS) frame from the receiving station within a specified period of time following an initial transmission. Alternatively, legacy preamble boost enable signal can be generated by the processor prior to an initial transmission based on a predetermined low received transmit power indication (RSSI) or a predetermined high signal to noise ratio (SNR) of a received unicast frame or signal from another access point (AP) or station (STA) in the wireless network.

The boosted RF gains coupled to the fourth MUX 622 predetermined fixed or variable values either hardwired to inputs of the fourth MUX or provided from registers in the processor or memory of the communication system. By variable values it is meant both that boosted RF gains can be different for each field and/or preamble segment, and that the RF gain for each individual field and/or preamble segment can be changed over time from one transmitted frame to the next. As noted above with reference to FIGS. 3A through 3D, in one embodiment the boosted RF gain for each individual field and/or preamble segment can be changed over time to boost the transmit power with which each preamble segment in the preamble field is transmitted can be boosted in 0.25 or 0.5 dB increments up to a predetermined maximum transmit power. The predetermined maximum transmit power can be based on either power limitations of the transmitter 600 or on regulatory or protocol power limits. For example, in wireless networks using a pre-802.11ax protocol the maximum transmit power with which each preamble segment in the preamble field can be transmitted is about 6 dB over that of the of the data field. The variable values for the boosted RF gains for each field and/or preamble segment can be determined either by an algorithm executed in the processor or by a look up table (LUT) in a memory of the system.

In another alternative embodiment of the of FIG. 6, the RF gain signals provided to the MUXs 618 and 622 are fixed or variable analog signals or values generated within the transmitter 600 or provided to the transmitter through a processor, such as that shown in FIG. 4.

A method for operating a communication system equipped with a transmitter including preamble boost circuitry to improve a range thereof will now be described with reference to the flowchart of FIG. 7.

Figure 7:
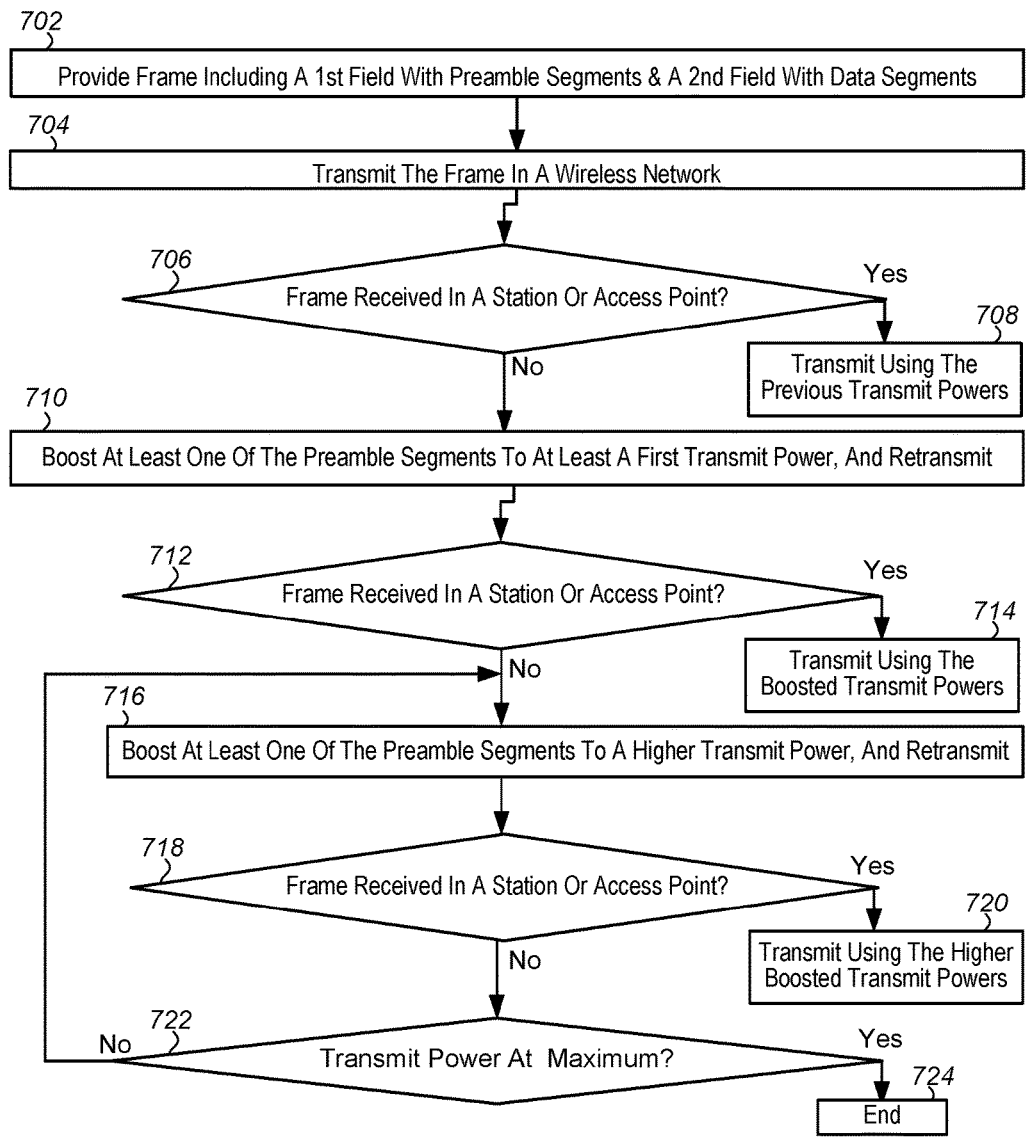
FIG. 7 is a flowchart of a method for operating a transmitter equipped with preamble boost circuitry to improve range of an access point (AP) and a station (STA) in a wireless network using a pre-802.11ax protocol in accordance with an embodiment of the present disclosure.

Referring to FIG. 7, the method begins with provide in or to the transmitter a frame including a first field having a number of preamble segments, including STF, LTF and SIG segments, and a second field having a number of data segments, such as data, header and/or VHT segments (702). Next, the frame is transmitted by the station (STA), access point (AP) or device equipped with a transmitter including preamble boost circuitry (704). As described above with reference to FIG. 1 this initial frame can be either a unicast frame by the STA, or an acknowledgement (ACK) frame transmitted upon entering a field or range of the AP in response to a unicast frame by the AP, such as a Clear to Send (CTS) frame or a request to Send (RTS) frame. The preamble segments of the first, preamble field and the data field can be transmitted at substantially the same transmit power, or, as described above with reference to FIGS. 3A to 3D, one or more the preamble segments can be transmitted a first field strength substantially higher than a second field strength at which segments of the data field are transmitted. Optionally, the transmit power of each of the preamble segments is between the first transmit power and the second strength and is independent of the transmit power of other preamble segments.

Next, it is determined whether or not a previously transmitted or specified frame is received in a station or access point (706). The specified frame can include an association request frame, authentication response or request frame, a code request etc. The determination that the specified frame has been received can be accomplished, for example, by processing logic in the transmitter or in a processor associated with the transmitter, determining that the transmitting station has received an acknowledgement (ACK) frame, a request to send (RTS) frame or clear to send (CTS) frame from the receiving station within a specified period of time following a transmission. If such an ACK, RTS or CTS frame is received by the transmitting station, the STA continues to communicate with the AP using the previous transmit power for both the preamble and data fields (708). If such an ACK, RTS or CTS frame is not received by the transmitting station after a predetermined period of time, the determination is made that the frame was not received in a station or access point, and a transmit power of at least one of the preamble segments (STF, LTF, SIG) is boosted to at least a first transmit power, greater than a second transmit power of the data field, and the frame is re-transmitted (710). A second determination is made to determine if the frame including the boosted preamble segment is received in a station or access point (712). If it is determined the frame was received, the STA continuous to communicate with the AP using the boosted transmit power for the preamble segment(s) (714). If the frame is not received after a predetermined period of time, the a transmit power of at least one of the preamble segments (STF, LTF, SIG) is boosted to at least a third transmit power, greater than the first transmit power, and the frame is re-transmitted (716). If it is determined the frame was received, the STA continues to communicate with the AP using the higher boosted transmit power for the preamble segment(s) (718).

If the frame is not received after a predetermined period of time, it is determined whether the higher boosted transmit power for the preamble segment(s) is equal to a predetermined maximum transmit power for the preamble segment(s) (720). If it is determined the higher boosted transmit power is equal to the predetermined maximum transmit power, the transmitting station is beyond the effective boosted range and attempts at transmission are stopped for the time being (722). If the higher boosted transmit power is not equal to the predetermined maximum transmit power, the transmit power of one or more of the preamble segments is incrementally increased and 716 through 722 repeated until a frame is detected or the predetermined maximum transmit power is reached. As noted above, the predetermined maximum transmit power can be based on either power limitations of commonly used wireless transmitters or on regulatory or protocol power limits. For example, in wireless networks using a pre-802.11ax protocol the transmit power with which each preamble segment in the preamble field is transmitted can be boosted by up to about 6 dB over that of the of the data field in 0.25 or 0.5 dB increments.

As described above in connection with FIGS. 5 and 6, preamble boost can also be enabled prior to an initial transmission by the STA based on a received transmit power indication (RSSI) or signal to noise ratio (SNR) of a received unicast frame or signal from the AP.

Alternatively, the preamble boost can also be enabled at any time during a continuing transmission on the transmitter receiving indication of or detecting a retry rate exceeding a specified maximum. An excessive retry rate indicates number of frames or packets in given time period that were corrupted upon arriving at the proper destination and had to be re-sent.

The features and advantages of embodiments of the system and method of the present disclosure will now be described with reference to the plots and graphs of FIGS. 8 through 10, and Table 1 below.

Figure 8:
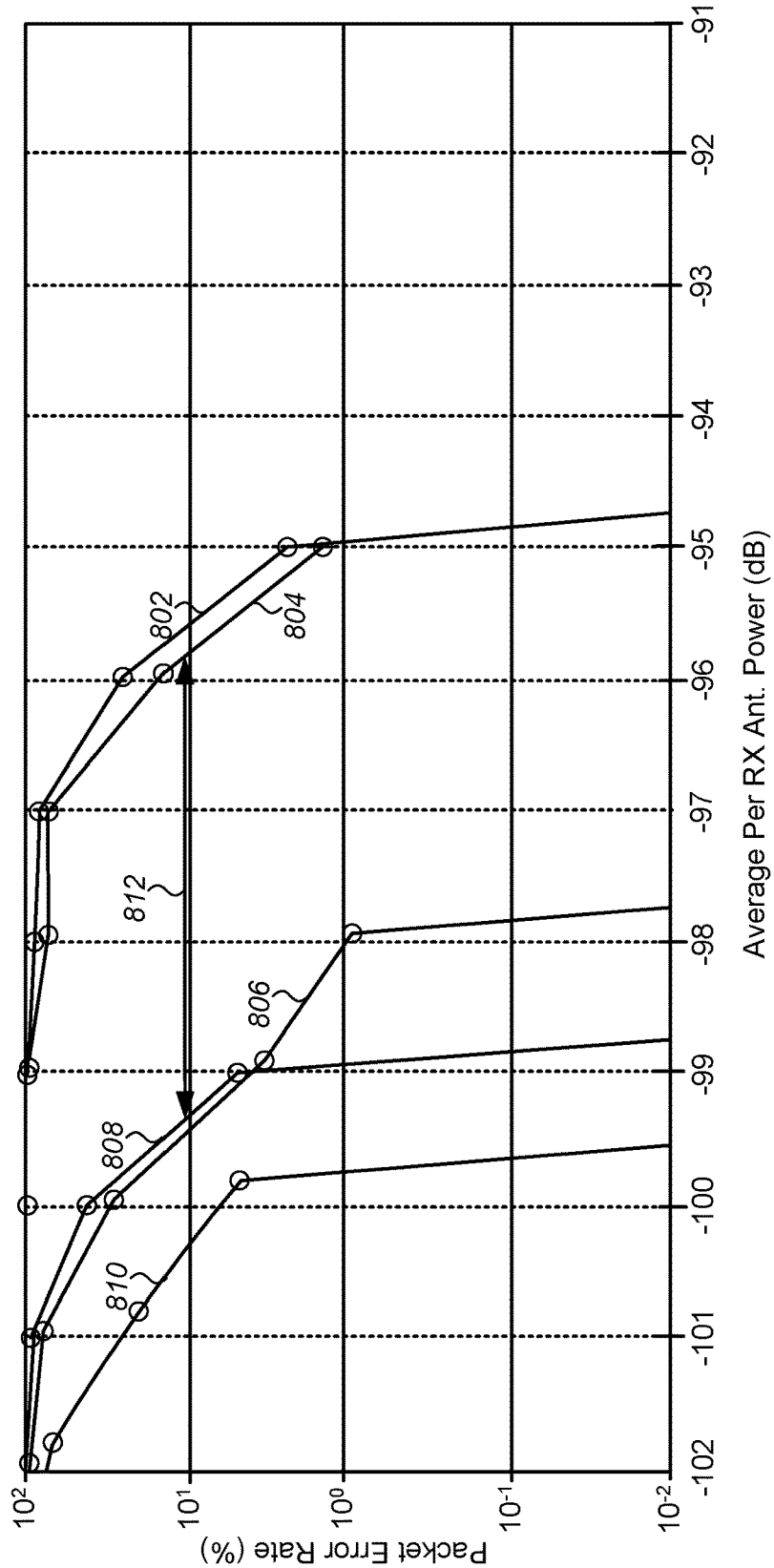
FIG. 8 is a plot of packet error rate (PER plots) versus average power per receive antenna as measured by a power meter (PM) for a two antenna receiver in a wireless network using a pre-802.11ax protocol, in which power used to transmit legacy preamble fields has been boosted by varying amounts protocol in accordance with an embodiment of the present disclosure.
Figure 9:
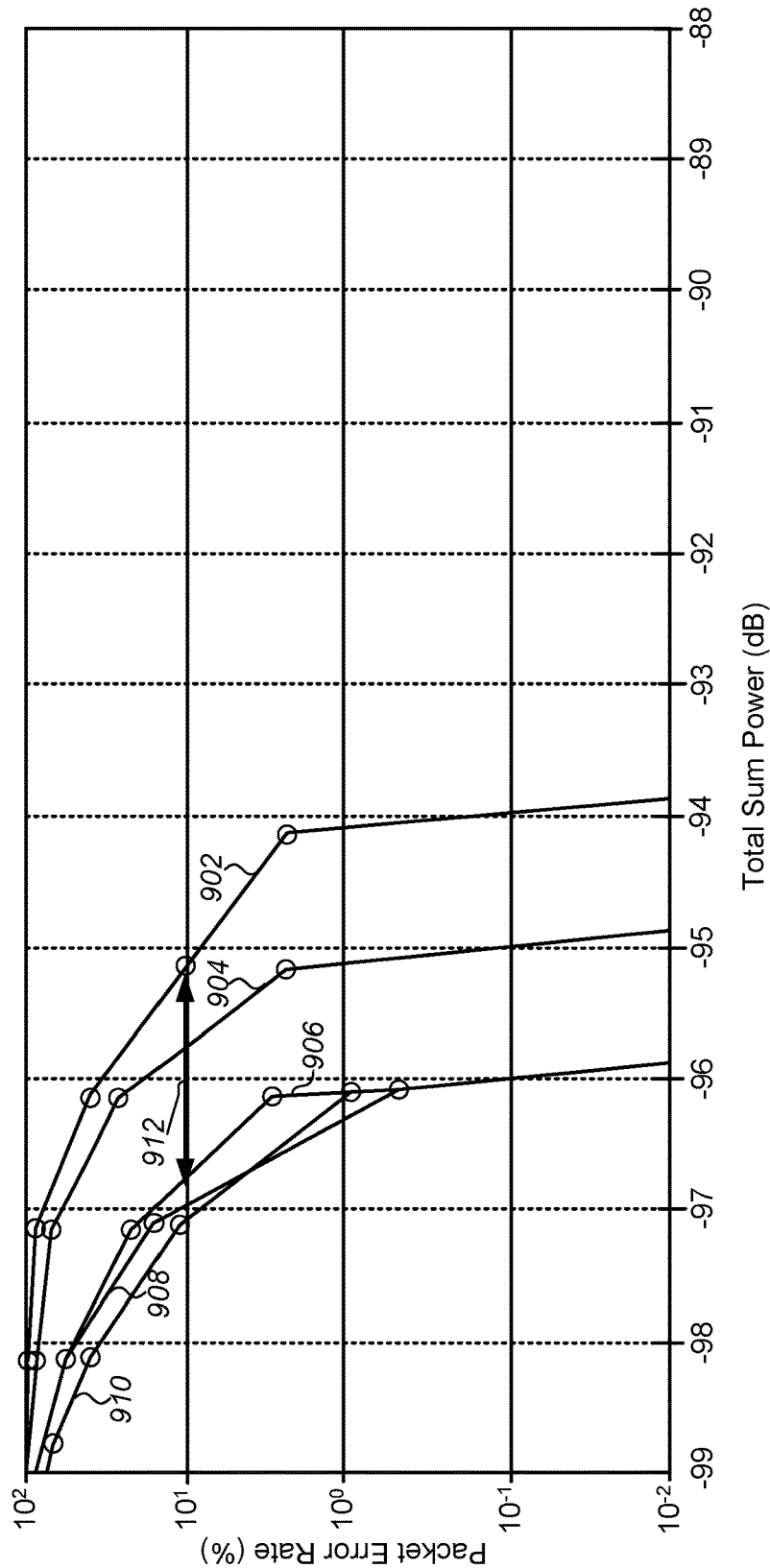
FIG. 9 is a PER plot versus a total sum of power as measured by a power meter (PM) for a one antenna receiver in a wireless network using a pre-802.11ax protocol, in which power used to transmit legacy preamble fields has been boosted by amounts in accordance with an embodiment of the present disclosure.

FIGS. 8 and 9 are packet error rate (PER plots) versus average and total received power for an 802.11ax access point or station operated at 20 MHz in a non-network mode showing gains in range generated from simulator software by playing back samples in which a transmit power of one or more preamble segments was boosted by 3 or 6 dB.

FIG. 8 is a PER plot versus average power per receive antenna as measured by a power meter (PM) for a two antenna receiver in a wireless network using a pre-802.11ax protocol. In FIG. 8, line 802 represents the PER versus average received power per receive antenna for a frame transmitted in a pre-802.11ax protocol in which transmit powers of none of the preamble segments (STF, LTF or SIG) has been boosted. Line 802 indicates that a received powers below about −95.5 dB, such as would result from a larger range or distance from the access point, the PER unacceptably exceeds about 10%, and can be referred to as the sensitivity of the system.

Line 804 represents the PER versus average received power for the same transmitter operated under the same simulated conditions, but with a frame in which a transmit power of a STF preamble segment has been boosted by 6 dB. Line 804 indicates that the PER does not exceed 10% until a received powers drops below about −95.8 dB, corresponding to a significantly improved sensitivity and a larger range or distance from the access point.

Line 806 represents the PER versus average received power for a frame in which the transmit power of a STF preamble segment has been boosted by 6 dB, and a transmit power of a LTF preamble segment has been boosted by 3 dB. Line 806 indicates that the PER does not exceed 10% until a received powers drops below about −99.4 dB, corresponding to a further improved sensitivity and a larger range from the access point.

Line 808 represents the PER versus average received power for a frame in which the transmit power of both the STF and LTF preamble segments have been boosted by 3 dB. Line 808 indicates that the PER does not exceed 10% until a received powers drops below about −99.3 dB.

Line 810 represents the PER versus average received power for a frame in which the transmit power of both the STF and LTF preamble segments have been boosted by 6 dB. Line 810 indicates that the PER does not exceed 10% until a received powers drops below about −100.3 dB, corresponding to a still further improved sensitivity and a larger range from the access point.

Arrow 812 indicates a gain in sensitivity that can be achieved at a specified maximum PER (10%) by boosting transmit power of one or more of the preamble segment by 3 to 6 dB.

FIG. 9 is a PER plot versus total PM power for a one antenna receiver in a wireless network using a pre-802.11ax protocol. In FIG. 9, line 902 represents the PER versus average received power per receive antenna for a frame transmitted in a pre-802.11ax protocol in which transmit powers of none of the preamble segments (STF, LTF or SIG) has been boosted. Line 902 indicates that a received powers below about −95.2 dB, such as would result from a larger range or distance from the access point, the PER unacceptably exceeds about 10%, and can be referred to as the sensitivity of the system.

Line 904 represents the PER versus average received power for the same transmitter operated under the same simulated conditions, but with a frame in which a transmit power of a STF preamble segment has been boosted by 6 dB. Line 904 indicates that the PER does not exceed 10% until a received powers drops below about −95.8 dB, corresponding to a significantly improved sensitivity and a larger range or distance from the access point.

Line 906 represents the PER versus average received power for a frame in which the transmit power of a STF preamble segment has been boosted by 6 dB, and a transmit power of a LTF preamble segment has been boosted by 3 dB. Line 906 indicates that the PER does not exceed 10% until a received powers drops below about −96.8 dB, corresponding to a further improved sensitivity and a larger range from the access point.

Line 908 represents the PER versus average received power for a frame in which the transmit power of both the STF and LTF preamble segments have been boosted by 3 dB. Line 908 indicates that the PER does not exceed 10% until a received powers drops below about −97 dB.

Line 910 represents the PER versus average received power for a frame in which the transmit power of both the STF and LTF preamble segments have been boosted by 6 dB. Line 910 indicates that the PER does not exceed 10% until a received powers drops below about −97.2 dB, corresponding to a still further improved sensitivity and a larger range from the access point.

Arrow 912 indicates a gain in sensitivity that can be achieved at a specified maximum PER (10%) by boosting transmit power of one or more of the preamble segment by 3 to 6 dB.

These improvements in gain sensitivity, range and area are summarized in Table 1 below.

TABLE 1

| Network Configuration | Sensitivity Gain (dB) | | Gain Increase Linear (%) | | Gain Increase Area (%) | |
|---|---|---|---|---|---|---|
| | 2T2R | 1T1R | 2T2R | 1T1R | 2T2R | 1T1R |
| No boost | 0 | 0 | | | | |
| STF 6 dB | 0 | 0 | 0% | 0% | 0% | 0% |
| STF 3 dB LTF 3 dB | 3.6 | 1.5 | 30% | 10% | 60% | 20% |
| STF 6 dB LTF 3 dB | 3.9 | 1.6 | 30% | 10% | 70% | 20% |
| STF 6 dB LTF 6 dB | 4.7 | 2.0 | 40% | 10% | 90% | 30% |

Figure 10:
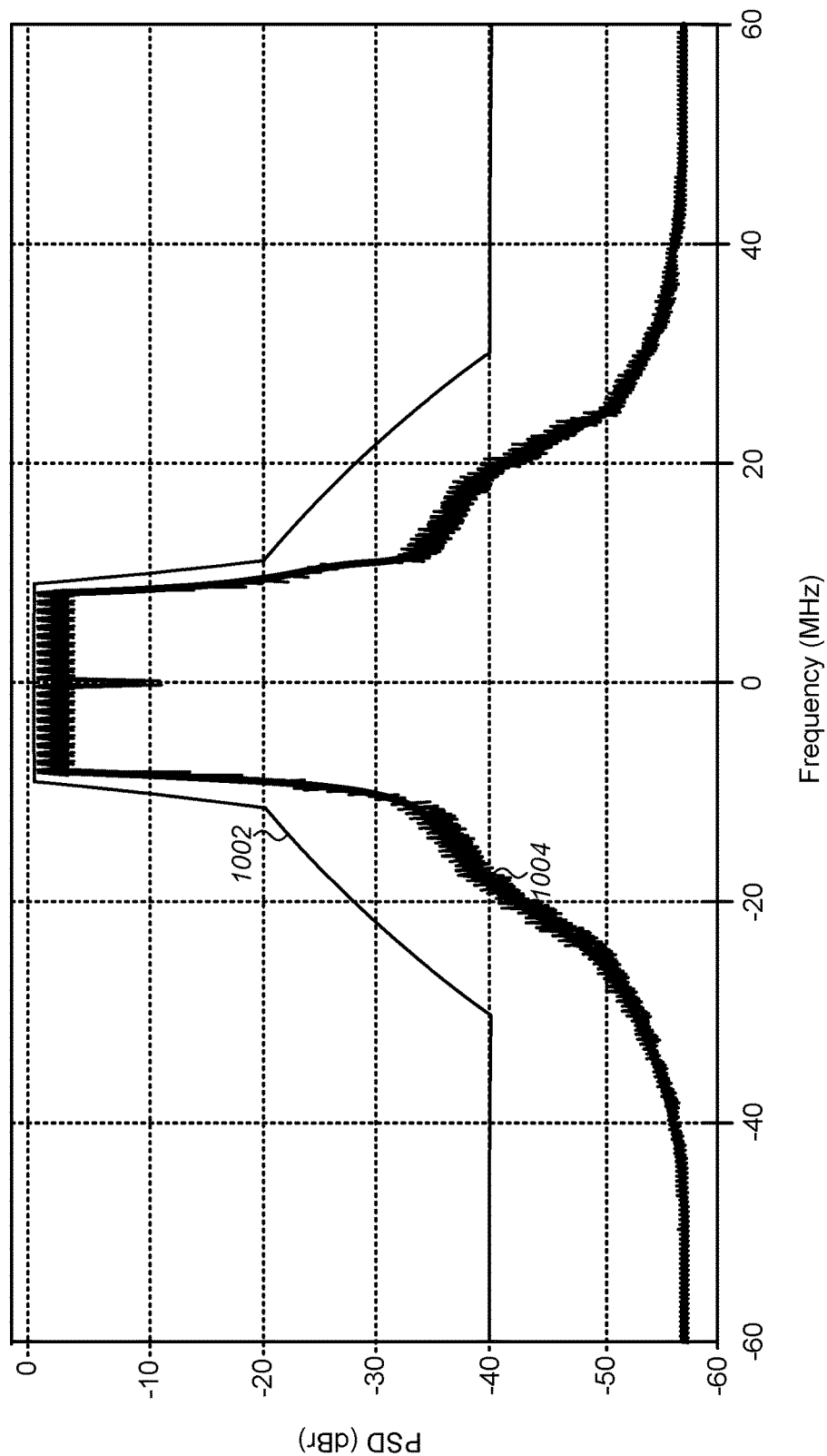
FIG. 10 is a spectral mask comparing spectral output for a transmitter in which legacy preamble fields have been boosted by varying amounts in accordance with an embodiment of the present disclosure to a model output.

FIG. 10 is a spectral mask comparing spectral output for a transmitter in which legacy preamble fields have been boosted by varying amounts in accordance with an embodiment of the present disclosure to a model output. Line 1002 of FIG. 10 indicates an ideal spectral mask for a wireless network operated according to a pre-802.11ax as modeled using computer verification or validation software, such as Mathcad®. The lines 1004 illustrate overlays of plots of spectral masks of for wireless network operated without boost, and with preamble boosts of STF and LTF preamble segments. Referring to FIG. 10, it is noted that substantially no difference spectral emissions between no-boost and embodiments in which the preamble segments were boosted between 3 and 6 dB. This indicates that a wireless network operated according to a pre-802.11ax and including one or more boosted preamble segments to extend an effective range of the system without adversely impacting spectral emissions.

Thus, a communication system and method of operating the same for extending a range of access points, stations or devices in a WiFi or WLAN, using a pre-IEEE 802.11ax or WiFi Gen 6 protocol have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method comprising:
   providing in a transmitter of a station in a wireless network a frame having a first field including a number of preamble segments and a second field including a number of data segments;
   operating the transmitter to transmit at least one of the number of preamble segments of the frame with at least a first transmit power, and to transmit the data segments of the second field of the frame at a second transmit power, wherein the first transmit power is greater than the second transmit power; and
   after operating the transmitter to transmit at least one of the number of preamble segments with at least the first transmit power:
   determining whether the transmitted frame has been detected by an access point in the wireless network, and
   if the transmitted frame has not been detected, re-transmitting the frame while operating the transmitter to transmit at least one of the number of preamble segments with an incrementally increased transmit power until a determination that the frame has been detected by the access point or a predetermined maximum transmit power is reached.

2. The method of claim 1 further comprising before operating the transmitter to transmit at least one of the number of preamble segments with at least a first transmit power greater than the second transmit power enabling a preamble boost circuit in the transmitter based on a predetermined low received transmit power indication (RSSI) or a predetermined high signal to noise ratio (SNR) of a received signal from another station (STA) or access point (AP) in the wireless network, or on a determination that a specified frame has not been received by the STA or AP.

3. The method of claim 1 wherein the first transmit power is selected based on a period of the at least one of the preamble segment transmitted therewith to comply with a regulated maximum average power.

4. The method of claim 1 wherein operating the transmitter to transmit at least one of the preamble segments with at least a first transmit power comprises operating the transmitter to transmit a plurality of preamble segments, wherein a transmit power of each of the plurality of preamble segments is independent of the transmit power of other preamble segments.

5. The method of claim 1 wherein the transmitter includes preamble boost circuitry coupled to a radio frequency (RF) amplifier and including a number of switching circuits to select between a boosted and non-boosted RF gain for each of the number of preamble segments, and wherein operating the transmitter to transmit at least one of the number of preamble segments with at least a first transmit power greater than the second transmit power comprises adjusting a gain of the RF amplifier on a per field basis.

6. The method of claim 5 wherein operating the transmitter to transmit at least one of the number of preamble segments with at least a first transmit power greater than the second transmit power further comprises adjusting a gain of the RF amplifier when transmitting the number of preamble segments on a per segment basis.

7. The method of claim 1 wherein the transmitter includes preamble boost circuitry coupled to a digital signal path in the transmitter and including a number of switching circuits to select between boosted and non-boosted scale factor for each of the number of preamble segments, and wherein operating the transmitter to transmit at least one of the number of preamble segments with at least a first transmit power greater than the second transmit power comprises summing at least one of the preamble segments with a boosted scale factor prior to digitally processing and transmitting the preamble segment.

8. The method of claim 1 wherein the frame is formatted using a pre-802.11ax protocol, and wherein the number preamble segments comprise one or more of a legacy short training field (LSTF), a legacy long training field (LLTF), and a legacy signal field (LSIG).

9. An integrated circuit (IC) comprising:
a transmitter configured to transmit a frame in a wireless network in a format using a frame having a first field including a number of preamble segments and a second field including a number of data segments,
wherein the transmitter comprises preamble boost circuitry configured to transmit at least one of the number of preamble segments with at least a first transmit power, and to transmit the data segments of the second field at a second transmit power, wherein the first transmit power is greater than the second transmit power; and
processing logic to determine whether a transmitted frame has been received by an access point in the wireless network, and wherein the transmitter is further configured to, if the transmitted frame has not been received, re-transmit the frame wherein at least one of the number of preamble segments it transmitted with a third transmit power greater than the first transmit power.

10. The IC of claim 9 wherein the transmitter is further configured to transmit a plurality of preamble segments, wherein a transmit power of each of the plurality of preamble segments is independent of the transmit power of other preamble segments.

11. The IC of claim 9 wherein the preamble boost circuitry is coupled to a radio frequency (RF) amplifier in the transmitter and includes a number of switching circuits to select between a boosted and non-boosted RF gain for each of the number of preamble segments, and wherein the preamble boost circuitry is configured to adjust a gain of the RF amplifier on a per field basis.

12. The IC of claim 11 wherein the preamble boost circuitry is further configured to adjust the gain of the RF amplifier when transmitting the number of preamble segments on a per segment basis.

13. The IC of claim 9 wherein the preamble boost circuitry is coupled to a digital signal path in the transmitter and includes a number of switching circuits to select between boosted and non-boosted scale factor for each of the number of preamble segments, and wherein the transmitter is configured to sum at least one of the preamble segments in the digital signal path with a boosted scale factor selected by the preamble boost circuitry prior to digitally processing and transmitting the preamble segment.

14. A system comprising:
one more antennas; and
an integrated circuit (IC) comprising:
a transmitter coupled to the antenna, the transmitter configured to transmit a frame in a wireless network in a format using a frame having a first field including a number of preamble segments and a second field including a number of data segments, wherein the transmitter comprises preamble boost circuitry configured to transmit at least one of the number of preamble segments with at least a first transmit power, and to transmit the data segments of the second field at a second transmit power, and wherein the first transmit power is greater than the second transmit power; and
processing logic to determine whether a transmitted frame has been received by an access point in the wireless network, and wherein the transmitter is further configured to, if the transmitted frame has not been received, re-transmit the frame wherein at least one of the number of preamble segments it transmitted with a third transmit power greater than the first transmit power.

15. The system of claim 14 wherein the transmitter is further configured to transmit a plurality of preamble segments, wherein a transmit power of each of the plurality of preamble segments is independent of the transmit power of other preamble segments.

16. The system of claim 14 wherein the preamble boost circuitry is coupled to a radio frequency (RF) amplifier in the transmitter and includes a number of switching circuits to select between a boosted and non-boosted RF gain for each of the number of preamble segments, and wherein the preamble boost circuitry is configured to adjust a gain of the RF amplifier on a per field and a per segment basis.

17. The system of claim 14 wherein the preamble boost circuitry is coupled to a digital signal path in the transmitter and includes a number of switching circuits to select between boosted and non-boosted scale factor for each of the number of preamble segments, and wherein the transmitter is configured to sum at least one of the preamble segments in the digital signal path with a boosted scale factor selected by the preamble boost circuitry prior to digitally processing and transmitting the preamble segment.

* * * * *